(12) United States Patent
Vignotto et al.

(10) Patent No.: US 7,712,841 B2
(45) Date of Patent: May 11, 2010

(54) LOCKING OF STUDS FOR MOUNTING A WHEEL TO A HUB USING CEMENTING MATERIAL

(75) Inventors: Angelo Vignotto, Turin (IT); Claudio Savarese, Airasca (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 11/515,670

(22) Filed: Sep. 5, 2006

(65) Prior Publication Data

US 2007/0057568 A1 Mar. 15, 2007

(30) Foreign Application Priority Data

Sep. 7, 2005 (EP) .................. 05108202

(51) Int. Cl.
*B60B 27/00* (2006.01)
(52) U.S. Cl. .............. 301/35.621; 301/105.1; 384/544; 411/82; 29/894.361
(58) Field of Classification Search ........... 301/35.621, 301/35.623, 35.624, 35.632, 105.1, 36.1; 29/894.36, 894.361, 894.362; 411/429, 430, 411/431, 82, 82.1, 82.2, 82.3; 188/18 A, 188/218 XL; 384/544
See application file for complete search history.

(56) References Cited

U.S. PATENT DOCUMENTS

| | | | | |
|---|---|---|---|---|
| 2,195,589 A | * | 4/1940 | Eksergian | 301/36.1 |
| 2,336,767 A | * | 12/1943 | Ash | 301/35.625 |
| 2,398,838 A | * | 4/1946 | Miller et al. | 411/107 |
| 2,404,520 A | * | 7/1946 | Mosher | 301/36.1 |
| 2,844,409 A | * | 7/1958 | Eksergian | 301/36.1 |
| 2,877,054 A | * | 3/1959 | Hjalmar Hedlund Folke et al. | 301/35.625 |
| 2,884,038 A | * | 4/1959 | Payne et al. | 411/82.1 |
| 2,970,008 A | * | 1/1961 | Leach | 301/1 |
| 3,145,362 A | * | 8/1964 | Kleven | 338/303 |
| 3,363,488 A | * | 1/1968 | Edmund et al. | 408/97 |
| 3,386,771 A | * | 6/1968 | Verdier | 301/35.625 |
| 3,582,141 A | * | 6/1971 | Kelsey, Jr. | 301/95.11 |
| 3,583,511 A | * | 6/1971 | Asberg | 180/370 |
| 3,857,611 A | * | 12/1974 | Pansky et al. | 301/35.631 |
| 5,360,212 A | * | 11/1994 | West | 269/40 |
| 5,446,967 A | * | 9/1995 | Gender | 33/203.18 |
| 5,913,547 A | * | 6/1999 | Fernandez | 29/525.02 |
| 5,988,955 A | * | 11/1999 | Curtis | 408/79 |
| 5,997,102 A | * | 12/1999 | Stanavich | 301/63.103 |
| 6,070,946 A | * | 6/2000 | Holmes | 301/36.1 |
| 6,758,646 B1 | * | 7/2004 | Ishida | 411/119 |
| 6,793,293 B2 | * | 9/2004 | Bunnow et al. | 301/11.1 |
| 6,997,519 B2 | * | 2/2006 | Fischbacher et al. | 301/35.621 |
| 2004/0069576 A1 | | 4/2004 | Torii et al. | |
| 2005/0073190 A1 | | 4/2005 | Wakisaka et al. | |
| 2005/0231025 A1 | * | 10/2005 | Yasumura et al. | 301/105.1 |

FOREIGN PATENT DOCUMENTS

| | | | |
|---|---|---|---|
| DE | 3108403 A1 | * | 10/1983 |
| EP | 0 878 327 A2 | | 11/1998 |
| JP | 0610976 A | * | 4/1994 |

* cited by examiner

*Primary Examiner*—Russell D Stormer
(74) *Attorney, Agent, or Firm*—Merchant & Gould P.C.

(57) ABSTRACT

A hub-bearing assembly for the wheel of a motor vehicle includes a rotatable hub (18) having a radial flange (17) with bores (16) formed therethrough. Wheel fastening studs (10) each have a stem (12) inserted non-forcedly through a respective bore (16). The studs (10) are fixed to the flange (17) by an adhesive or cementing material.

7 Claims, 1 Drawing Sheet

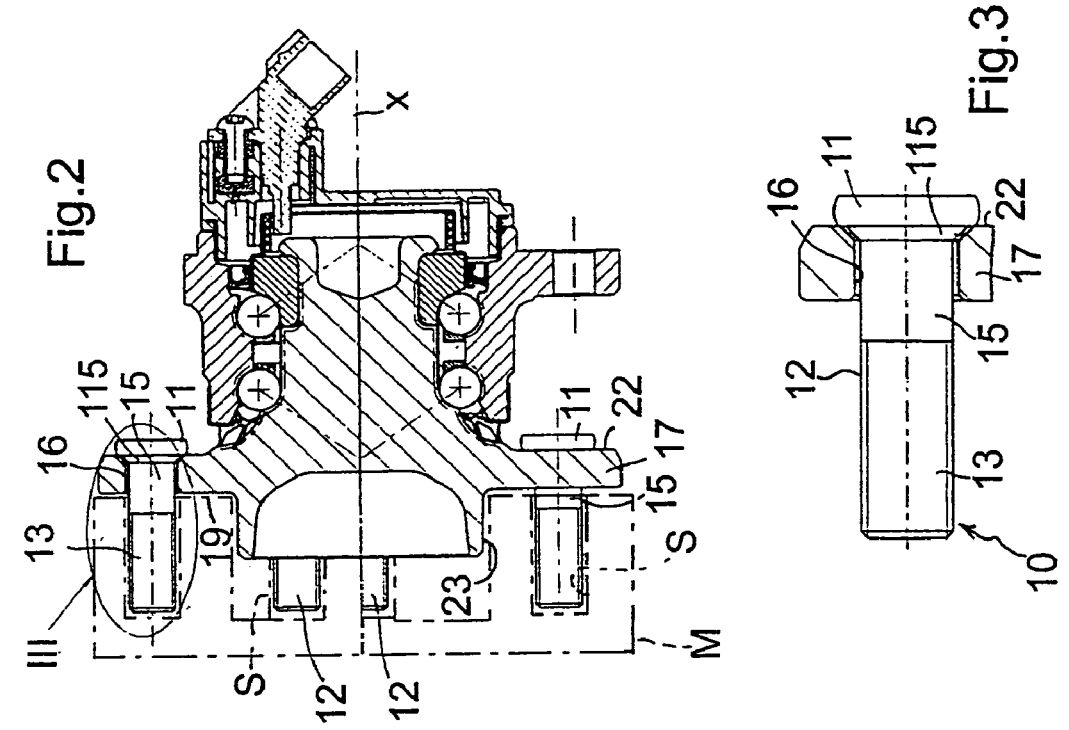
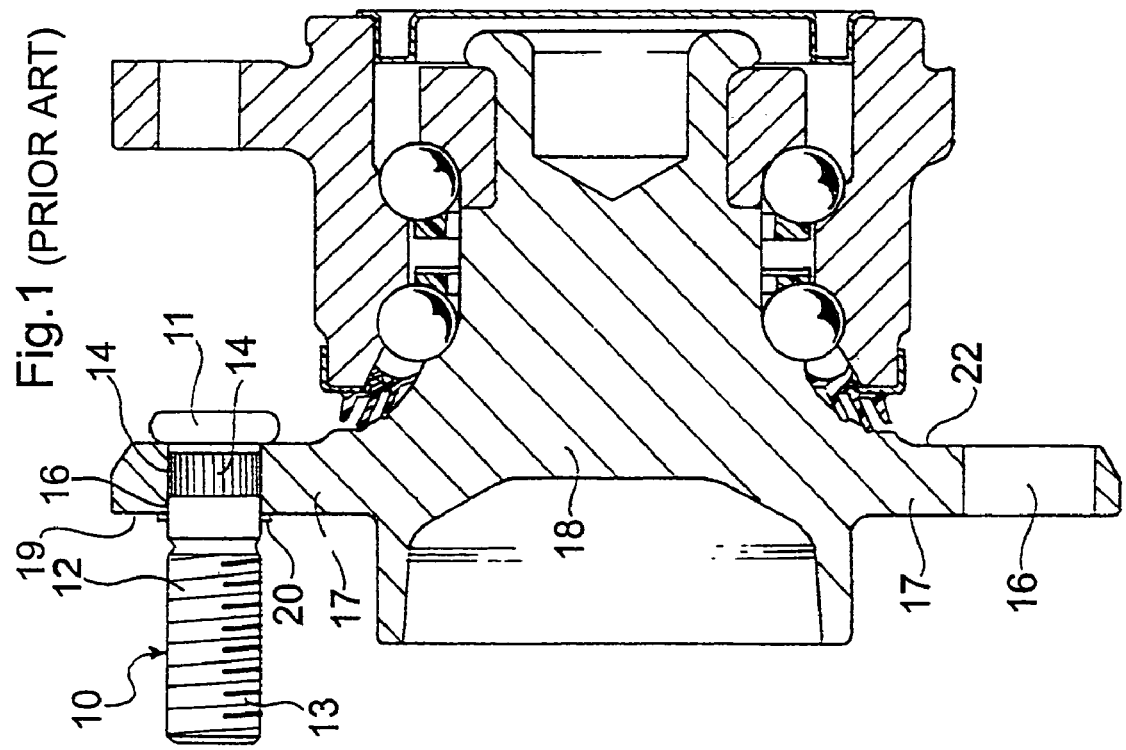

LOCKING OF STUDS FOR MOUNTING A WHEEL TO A HUB USING CEMENTING MATERIAL

The present invention refers to a method of locking studs for mounting a motor vehicle wheel onto a hub. The invention also relates to a hub-bearing assembly for a motor vehicle wheel.

BACKGROUND OF THE INVENTION

For a better understanding of problems and technical solutions currently known in connection with the locking of a stud on a hub, a conventional locking arrangement is briefly described, reference being made to FIG. 1 in the appended drawings.

Referring to FIG. 1, in order to fix the rim and the brake rotor to a radial flange 17 of the hub 18 of a wheel, most of the known solutions provide that the wheel (not shown), a flange of the brake rotor (not shown) and the radial flange 17 of the hub are axially flanked so as to align bores formed in these members. Usually, four or five bolts with studs 10 are employed, inserting the studs from the axially inner side (or inboard side) 22 of the hub flange. Each stud has a head 11 and a stem 12 with a threaded end portion 13 and a length 14 having an axial knurling near the head. The studs 10 are forcefully driven with radial interference into circular axial bores 16 formed in the flange 17 of the hub. After this forced insertion, first the brake member and then the wheel (not shown) are inserted from the outside on the end portions of the stud stems. Finally, outer nuts (not shown) are screwed and tightened with a predetermined torque. The knurlings 14 serve to rotationally lock the studs relative to the hub flange both when the aforesaid tightening torque is applied and when the nut is unscrewed for removing the wheel and/or the brake rotor.

Such locking effect can nevertheless fail due to the same forced driving step itself. In order that the knurling may engrave the material of the flange, the studs are previously hardened and tempered. However, the crests of a knurling are particularly difficult to harden in that, being sharp parts, they tend to decarburize. Therefore, in being forcefully driven as said, the crests of the knurling are abraded and the anti-rotation coupling loses its efficiency. This problem, besides being uncontrollable, appears when in attempting to tighten the nuts, the studs rotate, rendering this operation difficult. In addition, for the anti-rotation coupling to be efficient, the steel of which the hub is made must be considerably less hard than the material of which the studs are made.

A further problem concerning the driving lies in that, owing to the considerable radial interference required to prevent the studs from rotating relative to the hub, lumps of material 20 removed from the bores 16 are inevitably formed on the axially outer face 19 of the hub flange. Volcano-shaped formations of this kind are undesired as they constitute protrusions on the outer face 19. Instead, this face should ideally provide a completely flat surface against which the brake member abuts. Furthermore, the high axial driving forces cause further deformation in form of radial undulations on the axially outer face of the hub flange.

Owing to all of these factors, the outer face 19 does no longer provide a flat resting surface perpendicular to the axis of rotation. As a result, anomalous vibration (the so-called "juddering") occurs in operation.

As motor vehicle manufactures require to reduce to a minimum the so-called axial runout of the surface of the hub that serves as an axial rest for the brake rotor, after driving the studs it is necessary to subject the resting surface 19 to a finishing step on the lathe so as to eliminate or at least reduce the undesired effects of the forced driving. This finishing step is expensive, involves a long working time and is also made difficult owing to the presence of the studs driven through the hub flange. In order to obviate at least some of these problems, it has been proposed to form a recessed annulus embracing the zones where the bores 16 open onto the resting surface 19, so as to reduce or eliminate the adverse effect of the lumps 20. However, the undulations remain, and therefore a finishing step on the lathe is practically essential if axial runout is to be reduced to values being less than 30 μm.

SUMMARY OF THE INVENTION

The object of the present invention is therefore to provide a method of locking the studs for mounting the wheel on the hub in such manner as to obviate all drawbacks and limitations of the above discussed prior art.

This and other objects and advantages, which will be better understood hereinafter, are achieved according to the present invention by a hub-bearing assembly as defined in claim 1. According to another aspect of the invention, there is provided a method of locking studs as defined in claim 7. Preferred embodiments of the invention are set out in the dependent claims.

BRIEF DESCRIPTION OF THE DRAWINGS

A preferred but not limiting embodiment of the invention is described hereinafter with reference to the accompanying drawings, in which:

FIG. 1 is an axial cross sectional view of a hub-bearing assembly for a motor vehicle wheel equipped with conventional forcefully driven studs;

FIG. 2 is an axial cross sectional view of a hub-bearing assembly in accordance with the present invention; and FIG. 3 is an enlarged view of the detail indicated III in FIG. 2.

DETAILED DESCRIPTION OF THE PREFERRED EMBODIMENT(S)

Referring now to FIG. 2, wherein like numerals are used to designate like or corresponding parts already described with reference to FIG. 1, studs 10 of bolts for mounting a wheel (not shown) are inserted in non-forced manner through the axial bores 16 of the flange 17 of the hub. Throughout this description and the following claims, the expression "non-forced insertion" is to be construed as indicating that the studs are inserted in a substantially loose-fitting manner, i.e. with a slight radial play or at most a minimum radial interference with respect to the bores 16. At any rate, any possible interference should not suffice to lock the studs rotationally with respect to the hub flange upon tightening the nuts (not shown) of the bolts on the threaded distal lengths 13 of the studs.

As shown in FIG. 3, the stems 12 of studs 10 have no knurling. The proximal lengths 15 of the stems 12 connecting the threaded lengths 13 to the heads 11 exhibit smooth cylindrical surfaces with such a diameter as to allow non-forced insertion into the axial bores 16 of the flange 17.

According to the invention, prior to inserting the studs 10 in the bores 16, a certain amount of adhesive or cementing material is applied at the interface between the flange 17 and the studs 10, preferably between the bores 16 of the flange and the proximal lengths 15 of the stud stems 12. The adhesive or cementing material keeps the studs firmly locked on the hub, and, above all, serves to prevent the studs from rotating with respect to the hub upon tightening or unscrewing the outer nuts (not shown).

In the example of FIGS. 2 and 3, the heads 11 of the studs 10 are of circular shape, although studs having heads of different shape may also be used, for example hexagonal-head bolts.

As better seen in FIG. 3, in the preferred embodiment of the invention the axial bores 16 open on the axially inner side (or inboard side) 22 of the flange forming a chamfered or truncated cone shaped mouth 21. Advantageously, the stud heads 11 are joined to the proximal lengths 15 of the stems though a short tapered length 115 having a truncated cone shape corresponding to that of the mouths 21. The abutment between the truncated cone surfaces 21 and 115 favours the centring of the studs in the bores 16 and directs the stems 12 parallel to the central axis of rotation x of the hub.

An advantageous adhesive to use is a pressure-sensitive adhesive contained in microcapsules that break and let the liquid adhesive leak out in response to pressure or a strike. A layer of an adhesive of this kind is preferably applied on the proximal lengths 15 of the stud stems and/or the tapered lengths 115 prior to inserting the studs in the bores 16. The radial play between the bores 16 and the proximal lengths 15 may be selected so as to cause the microcapsule of the adhesive to break upon fitting the studs into the bores.

As an alternative to the aforesaid adhesive material a cementing material may be employed. Throughout this specification and the following claims, the expression "cementing material" indicates a substance or a blend of substances suitable for being applied to the flange 17 and/or the studs 10 in a liquid or semi-solid condition and capable of hardening in order to prevent relative rotation between the studs and the flange. Cementing substances or blends of cementing substances may comprise glues, for example anaerobe or cyanoacrilic glues, or epoxy resins with aluminium fillers, such as for example the one commercially available as DELO-Monopox 1196. The choice of the type of cementing material is to be made mainly based on the shear resistance that the cementing material is capable of offering.

Those skilled in the art will recognize that the invention attains the following advantages over the prior art mentioned in the introductory part of the specification.

The surface 19 of the flange that serves as an axial rest for the brake rotor will exhibit a low axial runout. The invention eliminates various plastic deformations (undulations, lumps, etc.) caused by a conventional forced driving and the conventional finishing steps aimed to reduce these deformations. The opposite surface 22 of the flange of the hub may be left coarse, thereby eliminating the conventional step of turning this face of the flange.

Having no knurling, the studs are manufactured through a simplified process and with a single diameter on which the threaded length is formed. The absence of knurling simplifies the heat treatment and removes the cited risk of decarburizing.

As the axial bores 16 of the flange 17 of the hub do not have to guarantee an accurate radial coupling with the studs, these bores do no longer require the conventional step of boring, which is eliminated.

It is possible to accurately direct the studs axially. To this end, an annular positioning template M, schematically shown in phantom line in FIG. 2, which is centered coaxially on the same outer surface 23 of the hub where the wheel (not shown) is then centered. The template M forms a plurality of axial seats S simulating the bores of the wheel and temporarily accommodating and retaining the stems 12 of the studs in order to guarantee a correct position and axial orientation of the studs with respect to the hub. This allows to avoid a final verification of the axial alignment that is currently required with forcedly driven studs.

The invention is not intended to be limited to the embodiment described and illustrated herein, which should be considered as an example of implementing the assembly; rather, the invention may be modified with regard to the shape and arrangement of parts and to constructional and functional details. For example, the invention is equally applicable to hub-bearing units different from that shown in FIG. 2, for example hub-bearing units in which the rotatable flanged member connected to the wheel is a radially outer flanged bearing race.

What is claimed is:

1. A hub-bearing assembly for the wheel of a motor vehicle, comprising:
   a member rotatable about an axis of rotation and having a radial flange with a plurality of bores formed therethrough, wherein the axial bores open on an axially inner side of the flange forming a chamfered or frustoconical mouth;
   a corresponding plurality of studs for fastening a wheel to the rotatable flanged member, wherein each stud comprises:
      a stud head,
      a cylindrical stem inserted non-forcedly through a respective one of the plurality of bores, each stem including a portion having a substantially smooth cylindrical surface, a tapered or frustoconical portion connecting the portion having a substantially smooth cylindrical surface of the stem to the stud head and complementary to the chamfered or frustoconical mouth of the bore; and a threaded portion proximate the portion having a substantially smooth cylindrical surface at an extended end of the stem;
   locking means for preventing rotation of the studs relative to the bores comprising an adhesive or cementing material applied between the bore and the portion of the stud stem having a substantially smooth cylindrical surface.

2. The hub-bearing assembly of claim 1, wherein the stems are not knurled.

3. The hub-bearing assembly of claim 1, wherein the adhesive material comprises a pressure-sensitive adhesive contained in microcapsules.

4. A method of locking studs for mounting a wheel of a motor vehicle to a hub-bearing assembly, comprising the steps of:
   a) providing a hub-bearing assembly including a member rotatable about an axis of rotation and having a radial flange with a plurality of bores formed therethrough, wherein the axial bores open on an axially inner side of the flange forming a chamfered or frustoconical mouth;
   b) providing a corresponding plurality of studs for fastening a wheel to the rotatable flanged member, each stud having an integral head and a stem, wherein each stem comprises a portion having a substantially smooth cylindrical surface and a threaded length at an end of the stem and proximate the portion having a substantially smooth cylindrical surface, the studs have a tapered or frustoconical portion connecting the portions of the stems having a substantially smooth cylindrical surface to the stud heads, and the mouths and the tapered portions have corresponding shapes, wherein abutment of the mouths and the tapered portions promotes centering of the studs in the axial bores and directs the stems parallel to the axis of rotation;

c1) applying an adhesive or cementing material onto at least one surface at the interface between proximal lengths of each stud stem and the bores of the flange, c2) inserting in a non-forced manner the stems of the studs through a respective bore, d) allowing the adhesive or cementing material to harden or solidify, wherein the hardened or solidified material locks the studs onto the flange and prevents relative rotation between each stud and the flange.

5. The method of claim 4, wherein the step of applying the adhesive or cementing material precedes the step of inserting the stems.

6. The method of claim 4, further comprising the steps of:

b1) providing a positioning template coaxially centered on the rotatable member, the template having a plurality of axial seats axially aligned with the bores, and c3) inserting the stems into the axial seats, wherein said seats temporarily accommodate and retain the stems axially directed parallel to the axis of rotation during at least part of the step of allowing the adhesive or cementing material to harden or solidify.

7. A method of locking studs for mounting a wheel of a motor vehicle to a hub-bearing assembly, comprising the steps of:

providing a hub-bearing assembly including a member rotatable about an axis of rotation and having a radial flange with a plurality of bores formed therethrough, wherein the axial bores open on an axially inner side of the flange forming a chamfered or frustoconical mouth;

providing a corresponding plurality of studs for fastening a wheel to the rotatable flanged member, each stud having a stem, wherein each stem comprises a portion having a substantially smooth cylindrical surface, the studs have a tapered or frustoconical portion connecting stud heads to the portions having a substantially smooth cylindrical surface, and a threaded portion proximate the portion having a substantially smooth cylindrical surface at an end of the stud opposite the head; the mouths and the tapered portions have corresponding shapes, wherein abutment of the mouths and the tapered portions promotes centering of the studs in the axial bores and directs the stems parallel to the axis of rotation;

applying an adhesive or cementing material onto at least one surface at the interface between proximal lengths of each stud and bores of the flange and then inserting in a non-forced manner the stems of the studs through a respective bore, allowing the adhesive or cementing material to harden or solidify to lock the studs onto the flange to prevent rotation of the studs relative to the bores.

* * * * *